United States Patent [19]
Nishio et al.

[11] Patent Number: 5,598,280
[45] Date of Patent: Jan. 28, 1997

[54] FILM LENS AND A SURFACE LIGHT SOURCE USING THE SAME

[75] Inventors: Toshikazu Nishio; Michiko Takeuchi; Nobu Masubuchi, all of Tokyo-to, Japan

[73] Assignee: Dai Nippon Printing Co., Ltd., Japan

[21] Appl. No.: 215,789

[22] Filed: Mar. 22, 1994

[30] Foreign Application Priority Data

Mar. 23, 1993 [JP] Japan ................................. 5-086954
Nov. 29, 1993 [JP] Japan ................................. 5-323214

[51] Int. Cl.⁶ ................................................... G02F 1/13
[52] U.S. Cl. ................................ 349/57; 362/31; 362/32; 385/147; 349/62
[58] Field of Search .............................. 359/261, 263, 359/291, 572, 589, 366, 642, 36, 40, 49, 69, 51, 619; 362/31, 32, 26, 27, 330, 329; 385/147

[56] References Cited

U.S. PATENT DOCUMENTS

| | | |
|---|---|---|
| 4,729,067 | 3/1988 | Ohe . |
| 4,924,356 | 5/1990 | French et al. .............................. 362/31 |
| 5,394,255 | 2/1995 | Yokota et al. ............................ 362/31 |

FOREIGN PATENT DOCUMENTS

| | | |
|---|---|---|
| 57-44365 | 9/1982 | Japan . |
| 1-241590 | 9/1989 | Japan . |
| 2-257188 | 10/1990 | Japan . |
| 4-91905 | 3/1992 | Japan . |
| 5-232466 | 9/1993 | Japan . |
| 5-45474 | 11/1993 | Japan . |
| 5-313004 | 11/1993 | Japan . |

*Primary Examiner*—David C. Nelms
*Assistant Examiner*—F. Niranjan
*Attorney, Agent, or Firm*—Parkhurst, Wendel & Burr, L.L.P.

[57] ABSTRACT

A film lens comprises a light transmitting base having one side and an opposite side, a plurality of concave or convex unit lenses formed on the one side of the light transmitting base, and a plurality of projections formed on the opposite side of the light transmitting base and having a profile height not smaller than the wavelength of a source light and not greater than 100 μm. In this arrangement, when the film lens is placed on a smooth surface of a light guide plate of a surface light source of the edge-light type, the projections on the reverse side of the light transmitting base can secure a gap with a width not smaller than the wavelength of the source light between the film lens and the light guide plate. Thus, the source light can be uniformly distributed without hindrance throughout the light guide plate as it is totally reflected by the surface of the guide plate. In the surface light source using the film lens, moreover, the lens can provide a uniform luminance in a desired angular range, and a uniform luminance distribution can be obtained for the whole surface without concentration in the vicinity of the light source.

6 Claims, 11 Drawing Sheets

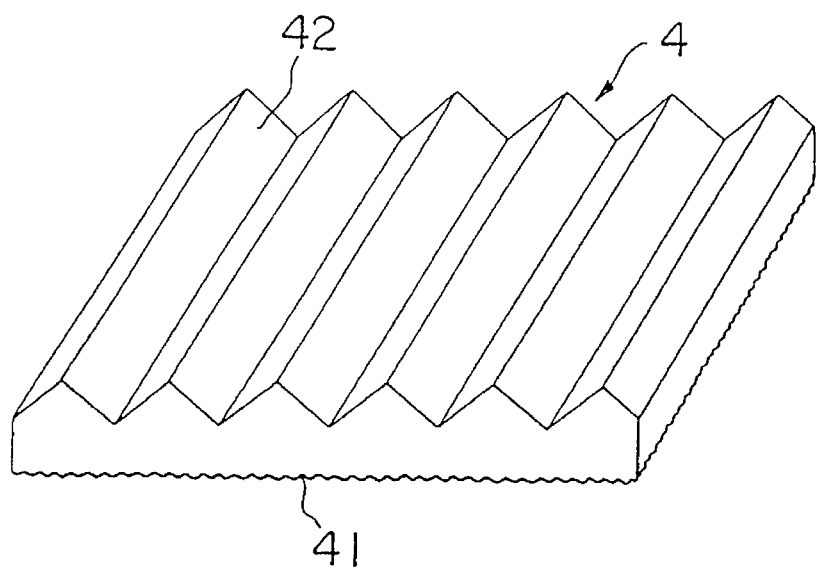
F I G. 7
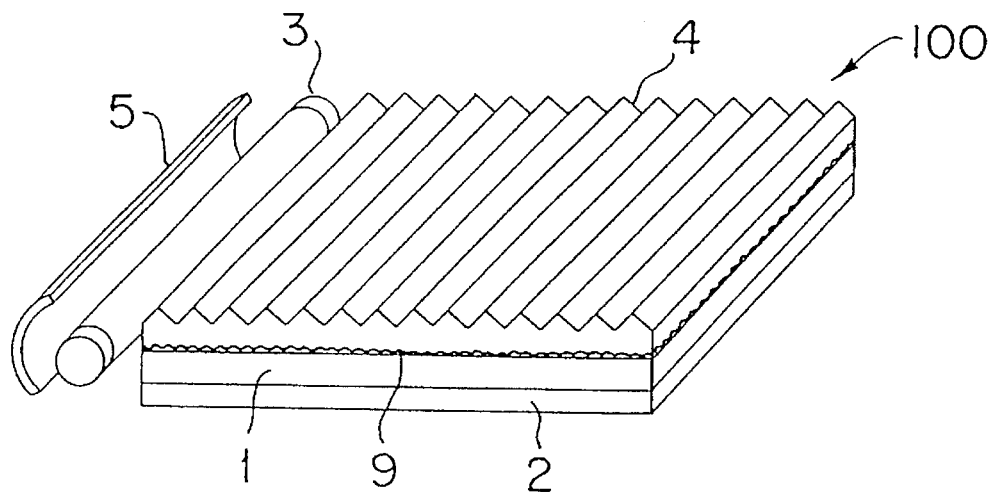
F I G. 8

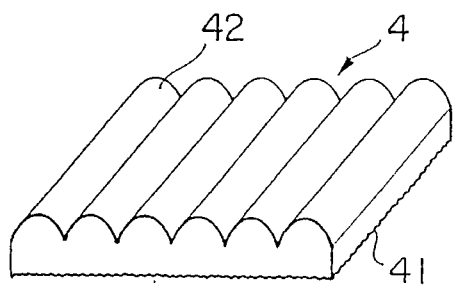
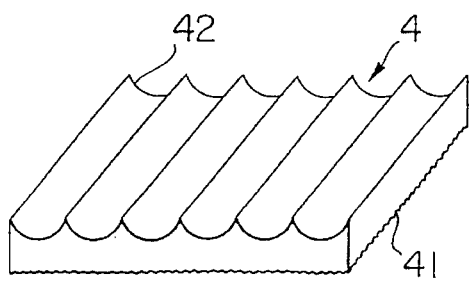
FIG. 13    FIG. 14
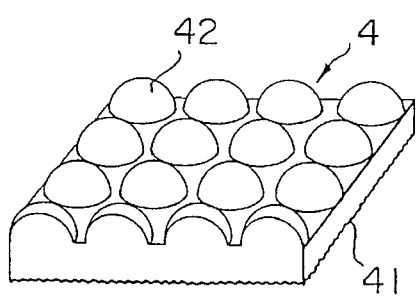
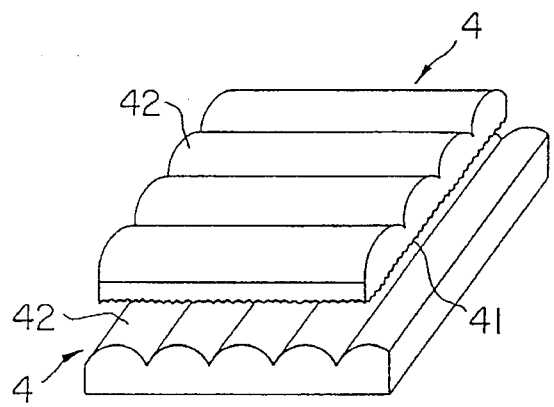
FIG. 15    FIG. 16

FILM LENS AND A SURFACE LIGHT SOURCE USING THE SAME

BACKGROUND OF THE INVENTION

1. Field of the Invention

The present invention relates to a film lens and a surface light source using the same, and more particularly, to a surface light source adapted for back-lighting for a display unit, such as a liquid crystal display unit, illuminated advertising display, traffic-control sign, etc.

2. Information of the Related Art

FIG. 1 shows a conventional surface light source of the edge-light type, which comprises a light transmitting flat plate as a light guide plate 1, and is used as back-light source for a liquid crystal display unit (LCD). In this surface light source, a light beam is applied from both or one of the side end faces of the light guide plate 1 so that it is propagated throughout the plate 1 by utilizing total reflection in the light transmitting plate. Part of the propagated light beam is reflected by a light scattering reflector plate on the reverse side of the light guide plate 1, thus forming a diffused reflected light beam with an angle of reflection narrower than the critical angle, and the diffused light beam is emitted from the obverse side of the plate 1 (Jpn. UM Appln. Laid-Open publication No. 162201/1980).

In another example of the surface light source for back-lighting, as shown in FIGS. 2 and 3, a film lens 4, which has projections or lenticular lenses, each in the form of a triangular prism, on one side and a smooth surface on the other side, is stacked on the obverse side of a light guide plate 1 of the surface light source, with the projections upward. In this arrangement, a diffused reflected light beam can be uniformly diffused in an isotropic manner within a desired angular range by utilizing the light converging effect of the lens (Jpn. UM Appln. KOKAI Publications Nos. 4-107201 and 4-107237). When this film lens 4 is used in combination with a matte transparent diffuser sheet, the optical energy of the light source can be distributed more intensively within a desired limited angular range so that a diffused light beam with higher isotropy can be obtained in this range than in the case where a matte transparent diffuser sheet is used singly (U.S. Pat. No. 4,729,067).

In the aforementioned prior art arrangement (FIG. 1), however, the light scattering reflector plate is only provided on the reverse side of the light guide plate 1, so that the emitted light beam has a relatively sharp distribution with a peak angle of 60° to a line normal to the obverse side of the light guide plate. Thus, the luminance with respect to the direction of the normal line, along which the brightest light is required, is insufficient, and the optical energy is dispersed in oblique directions in which less light is demanded. According to the alternative prior art arrangement (FIG. 2), the triangular lenticular film lenses on the light emitting surface of the light guide plate refractively converge the emitted light beam, so that the ratio of the optical energy of the light beam emitted within the angular range of 30° to 60° increases with its peak in the normal direction of the light emitting surface. As shown in FIG. 3, smooth surfaces on the reverse side of the film lens and the obverse side of the light guide plate are intimately in contact with each other and are integrated optically, so that total reflection cannot occur on the obverse side of the light guide plate.

As regards the luminance distribution within the plane of emission, therefore, high luminance is obtained within a distance of 2 to 4 cm from the source-side end portion of the light guide plate. The luminance gradually lowers with distance from the light source, and darkness is conspicuous in the region most remote from the light source (corresponding to the end portion on the opposite side to the light source or the central portion of the surface light source).

In order to eliminate these drawbacks, an attempt has been made to correct and equalize the luminance distribution within the plane of the light guide plate (Jpn. Pat. Appln. KOKAI Publication No. 1-245220). According to this arrangement, a light scattering layer on the reverse side of the light guide plate is formed in mesh patterns, and the area of the patterns is increased with distance from the light source.

In order to obviate the aforesaid drawbacks, moreover, another attempt has been made to correct and equalize the luminance distribution within the plane of the light guide plate (Jpn. Pat. Appln. KOKAI Publication No. 3-9306). In this case, two or more light sources are arranged around the side end portions of the light guide plate.

In either case, however, it is difficult to equalize the luminance perfectly. In the case of Jpn. Pat. Appln. KOKAI Publication No. 1-245220, the mesh patterns of the light scattering layer are inevitably conspicuous. In the case of Jpn. Pat. Apptn. KOKAI Publication No. 3-9306, on the other hand, the necessary space and power consumption of the light sources are doubled at the least.

As shown in FIG. 4, moreover, the diffusion angle may be controlled in two directions (vertical and horizontal) by combining two film lenses 4-1 and 4-2 in a manner such that their respective ridges extend at right angles to each other.

If the two film lenses 4-1 and 4-2 are stacked in layers, however, interference fringes of equal thickness (e.g., Newton's rings) are generated between unit lenses 42 on the lower film lens 4-1 and a smooth surface on the reverse side of the upper film lens 4-2, thereby lowering the image quality.

SUMMARY OF THE INVENTION

An object of the present invention is to provide a film lens and a surface light source using the same, capable of emitting uniform, high-luminance light only within a desired angular range without increasing power consumption or heat release value, and free from variation in luminance depending on the in-plane position.

Another object of the present invention is to provide a film lens and a surface light source using the same, free from interference fringes of equal thickness.

A film lens according to the present invention comprises a light transmitting base having one side and an opposite side, a plurality of concave or convex unit lenses formed on the one side of the light transmitting base, and a plurality of projections formed on the opposite side of the light transmitting base and having a profile height not smaller than the wavelength of a source light and not greater than 100 μm.

According to this arrangement, when the film lens is placed on a smooth surface of a light guide plate of a surface light source of the edge-light type, the projections on the opposite side (reverse side) of the light transmitting base can secure a gap with a width not smaller than the wavelength of the source light between the film lens and the light guide plate. Thus, the source light can be uniformly distributed without hindrance throughout the light guide plate as it is totally reflected by the surface of the guide plate.

In the surface light source using the film lens, moreover, the lens can provide a uniform luminance in a desired angular range, and a uniform luminance distribution can be obtained for the whole surface without concentration in the vicinity of the light source.

In another film lens according to the present invention, the height $\Delta h$ of each projection is given by $$\Delta h \geq \lambda_{max}/2\Delta\theta^2$$

where $\lambda_{max}$ is the maximum wavelength of the visible spectrum of a light source for the observation of the film lens, and $\Delta\theta$ is the angular radius of the light source as viewed through a reflective surface of the film lens, the projections are arranged noncyclically in one- and two-dimensional modes, and the width $\Delta x$ of each projection is given by $\Delta x \leq 100$ μm and the average distance d between each two adjacent projections is given by $$d < 2P$$

where P is the arrangement cycle of the unit lenses.

In this film lens, the projections with a predetermined size distribution are provided on the reverse side (opposite to the side on which the unit lenses are formed), so that interference fringes of equal thickness can be restrained from being formed on the reverse side of the film lens.

BRIEF DESCRIPTION OF THE DRAWINGS

FIG. 7 is a perspective view of a single-layer film lens according to a first embodiment of the invention, having lenticular lenses each in the form of a triangular prism and a group of projections formed directly on the reverse side thereof;

FIG. 8 is a perspective view of the surface light source according to the first embodiment of the invention;

FIG. 13 is a perspective view of a film lens according to a further modification of the first embodiment of the invention, having convex cylindrical lenticular lenses;

FIG. 14 is a perspective view of a film lens according to an additional modification of the first embodiment of the invention, having concave cylindrical lenticular lenses;

FIG. 15 is a perspective view of a film lens according to a further modification of the first embodiment of the invention, formed of an ommateal lens;

FIG. 16 is a perspective view of a film lens according to another modification of the first embodiment of the invention, in which two cylindrical lenticular lens sheets are stacked in layers so that their respective axes extend at right angles;

DETAILED DESCRIPTION OF THE PREFERRED EMBODIMENTS

[First Embodiment]

For example, a lens sheet 4 according to a first embodiment of the present invention may be composed of a group of cylindrical unit lenses 42 (lenticular lenses in a broad sense) adjacently arranged with their respective longitudinal axes (ridges) parallel to one another, as shown in FIG. 7, or of an ommateal lens including a number of protuberant unit lenses 42, e.g., each in the form of a hemispherical projection having an independent circumference, which are arranged in a two-dimensional manner.

The profile of each unit lens may have the shape of a continuous smooth curve, e.g., circular, elliptic, cardioid, Rankine's-egg-shaped, cycloid, or involute, as shown in FIGS. 13 and 14. Alternatively, the profile may be formed of part or whole of a polygon, such as a triangle or hexagon, as shown in FIG. 7.

Each unit lens may be convex, as shown in FIG. 13, or concave, as shown in FIG. 14. Preferably, the unit lens should be shaped like a circular or elliptic cylinder in consideration of ease of design and manufacture, light condensing capability, light diffusion properties (half-angle, scarcity of side-lobe light (peak of luminance in oblique direction), isotropy of in-half-angle luminance, normal-direction luminance, etc.), and the like. An ellipse whose major axis extends in the normal direction of a surface light source is a particularly preferable configuration, since it ensures high luminance. Preferably, the ratio of the major axis length to the minor axis length ranges from 1.27 to 1.56, in particular.

Figure 11:
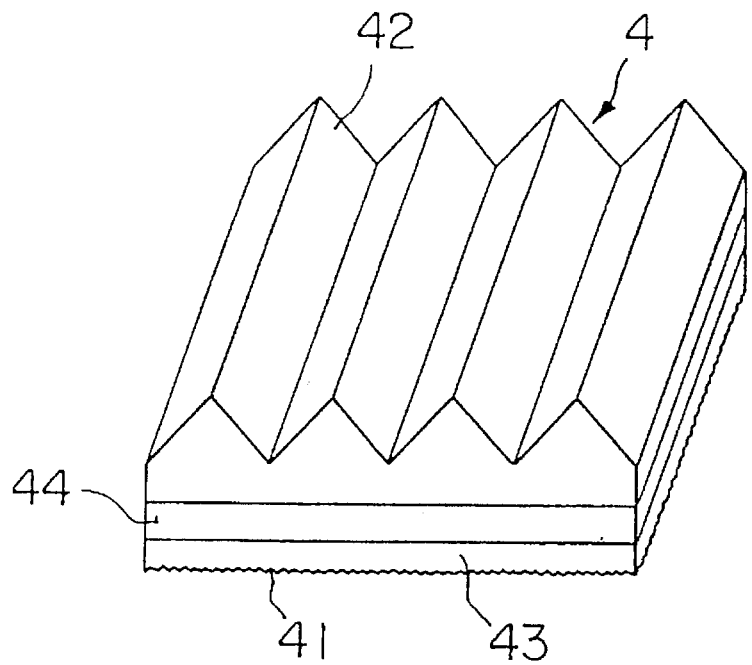
FIG. 11 is a perspective view of a film lens according to another modification of the first embodiment of the invention, formed on a transparent base sheet.

Although the lens sheet may be used singly, two lens sheets may be arranged in layers such that their respective longitudinal axes cross at right angles, as shown in FIG. 16, in order to control light diffusion angles in two directions (vertical and crosswise) by means of the cylindrical lenses. In this case, the best optical transmission can be obtained if the respective lens surfaces of the two sheets face in the same direction, as shown in FIG. 16. Naturally, however, the lens sheets may be arranged so that their lens surfaces face each other. Alternatively, moreover, the lens sheet may be obtained by integrally molding a light transmitting base material, as shown in FIG. 7, or by forming unit lenses 42 on a light transmitting plate (or sheet) 44, as shown in FIG. 11.

The lens sheet 4 is formed of a light transmitting base. The base material used may be a simple acrylic ester or methacrylate ester or a copolymer thereof such as polymethyl methacrylate or polymethyl acrylate, polyester such as polyethylene terephthalate or polybutylene terephthalate, thermoplastic resin such as polycarbonate, polyethylene, or polymethylpentene, acrylate such as polyfunctional urethane acrylate, crosslinked by means of ultraviolet rays or electron rays, or polyester acrylate, transparent resin such as unsaturated polyester, transparent glass, or transparent ceramics.

If the light transmitting base is used for the lens sheet, its overall thickness normally ranges from about 20 to 1,000 µm.

There are some methods for shaping the lenses. Among these methods, a conventional heat-press method is described in Jpn. Pat. Appln. KOKAI Publication No. 56-157310, for example. In another method described in Jpn. Pat. Appln. KOKAI Publication No. 61-156273, an ultraviolet-curing thermoplastic resin film is embossed by means of a roll-embossing plate, and is then exposed to ultraviolet rays to be cured. According to an alternative method disclosed in Jpn. Pat. Appln. KOKAI Publication No. 3-223883, U.S. Pat. No. 4,576,850, etc., moreover, a roll intaglio engraved with a lens shape pattern is coated with an ultraviolet- or electron-radiation-curing liquid resin so that its depressions are filled with the resin. Thereafter, ultraviolet rays or electron rays are applied to the roll intaglio, with a transparent base film thereon, through the liquid resin. The resulting cured resin and the base film bonded thereto are released from the intaglio. Thus, the cured resin layer is shaped to the lens shape pattern of the roll intaglio.

The light transmitting base should have light transmission properties such that it can transmit a minimum volume of diffused light without a hindrance to applications. Although it is most advisable to use a colorless, transparent base, the base may be a colored, transparent one or matte semitransparent one, depending on the applications.

A "matte transparent" material is a material which diffusively transmits light in a substantially uniform, isotropic manner with respect to every direction within a semisolid angle, and is used as a synonym for an optically isotropic, diffusive material. More specifically, "matte and transparent" indicates that an angular distribution $I^o(\theta)$ of the transmitted light intensity observed when a parallel luminous flux is incident upon the reverse side of the light transmitting base (angle of incidence i=0°) is a cosine distribution given by $$I^o(\theta)=I^o_{mp}\cos\theta,$$

$\theta$ ($-90°\leq\theta\leq90°$) is the angle between the obverse side of the base and a normal line N, and $I^o_{mp}$ is the transmission strength in the normal direction, or a similar distribution.

A group of projections 41 on the reverse side of the lens sheet, having a profile height not smaller than the wavelength of a source light and not greater than 100 µm, may be formed directly on the reverse side of the integrally molded lens sheet 4 by heat-press embossing, sandblasting, etc., as shown in FIG. 7, or obtained by forming a light transmitting material layer having projections on the flat reverse side of the sheet 4, as shown in FIG. 11. In a specific available method, the lens sheet is coated with a paint which is composed of transparent minute particles of calcium carbonate, silica, or acrylic resin dispersed in a transparent binder, so that the minute particles make the coating film surface uneven. According to the aforementioned alternative method disclosed in Jpn. Pat. Appln. KOKAI Publication No. 3-223883 and U.S. Pat. No. 4,576,850, an ultraviolet- or electron- radiation-curing liquid resin is molded on a roll intaglio so that the resulting surface is matte, having minute indentations.

Figure 6:
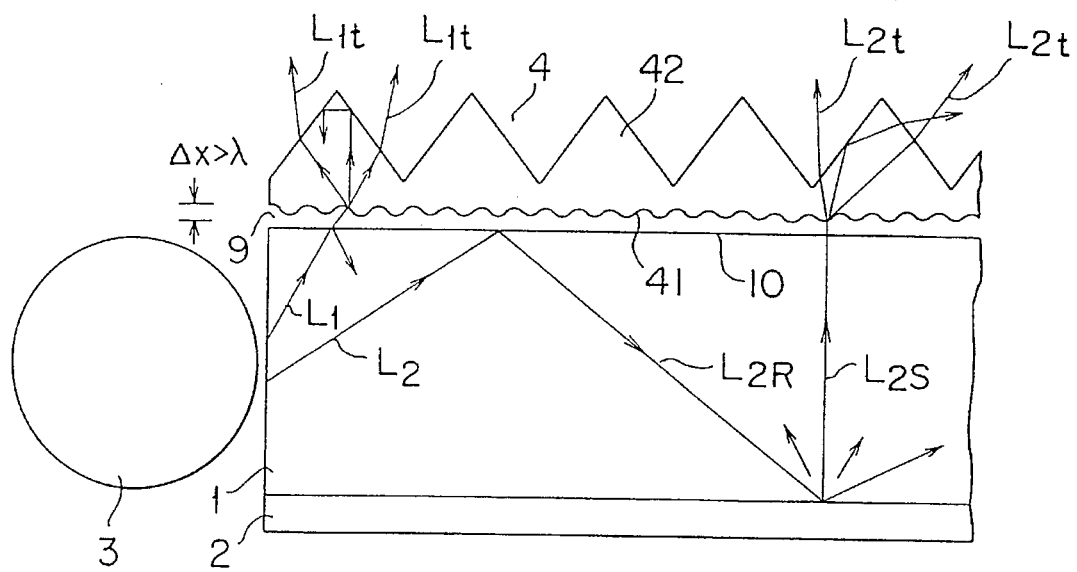
FIG. 6 is a sectional view of a surface light source of the edge-light type according to a modification of the first embodiment of the invention, having a group of projections formed directly on a film lens.

The projections 41 are designed so that a gap 9 having a width $\Delta x$ not smaller than the wavelength of the source light is formed at least partially between a smooth surface 10 of a light guide plate 1 and the lens sheet 4, as shown in FIG. 6. If the gap width $\Delta x$ is smaller than the wavelength of the source light, as mentioned later, satisfactory total reflection of light on the smooth surface 10 of the plate 1 cannot be enjoyed. If the gap width is greater than 10 µm, on the other hand, the indentations of the projections 41 are improperly conspicuous.

The projections 41 may have any rugged contour provided that the above object is achieved. Preferably, however, irregular indentations (e.g., sand-grain patterns, pear-skin patterns, etc.) are formed all over the reverse side of the lens sheet 4, as shown in FIGS. 6, 7, 10 and 11, in order to obtain an angular distribution for uniform luminance within a desired diffusion angle and a uniform luminance distribution within the light source plane.

In this arrangement, the projection group 41 also serves as a light diffusion layer which diffuses light beams L1, L2S, etc. incident upon the reverse side of the lens sheet 4 in an isotropic manner. Thus, a uniform angular distribution can be obtained without separately using a polished transparent sheet, and the mesh patterns are unobtrusive, as shown in FIG. 6.

Naturally, moreover, an optically isotropic diffusive sheet 8, which is matte and transparent and is formed with a group of projections 41 having a profile height not smaller than the wavelength of the source light on the reverse side and not greater than 100 µm, may be interposed between the lens sheet 4 and the smooth surface 10 of the light guide plate. In this case, however, there are a plurality of interfaces (smooth surface 10, projection group 41, isotropic diffusive sheet 8, reverse side of lens sheet 4, and inside of the sheet 8 in the presence of a flatting agent) through which light diffuses, so that a loss of effective light energy in the vicinity of the normal line increases.

Figure 12:
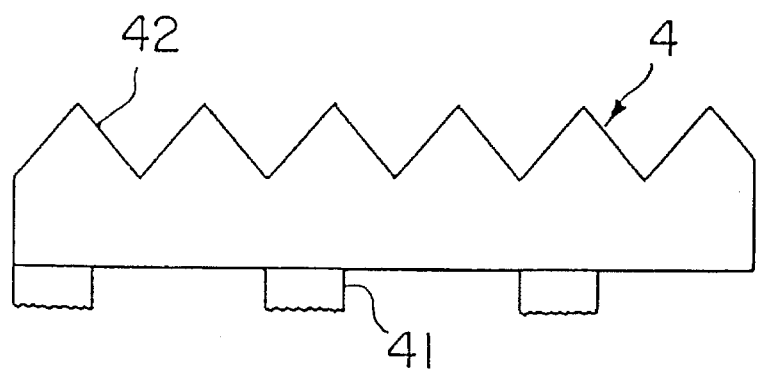
FIG. 12 is a sectional view of a film lens according to still another modification of the first embodiment of the invention, having a group of projections formed partially.

As shown in FIG. 12, furthermore, the projection group 41 may be composed of spaced dotted patterns, such as mesh patterns, which are distributed within a plate. Since the patterns 41 arranged in this manner are too conspicuous, however, dispersing the flatting agent in the lens sheet 4 or other measure is required.

The surface light source according to the first embodiment of the present invention is constructed in the manner shown in the sectional view of FIG. 6 and the perspective view of FIG. 8. More specifically, the light source comprises the light guide plate 1, a linear or point light source 3 located adjacent to at least one spot of the terminal portion of the plate 1, a light reflecting layer 2 on the reverse side of the plate 1, the lens sheet 4 on the opposite side of the plate 1 to the layer 2, at the least. Usually, the surface light source additionally comprises a source light reflector 5, a housing (not shown) containing all the elements and having a light emitting surface in the form of a window, a power source (not shown), etc.

The opposite surface 10 of the light reflecting layer of the light guide plate 1 is a level surface which is finished so that its roughness (measured in terms of the ten-point average roughness Rz provided by JIS-B-0601 or the like) is reduced to the level of the wavelength of the source light or below. Usually, the source light is a visible light whose wavelength ranges from 0.4 to 0.8 μm, so that the surface roughness is 0.4 μm or less.

Finishing to this level of roughness may be effected by a conventional method, such as heat-pressing using a mirror plate, injection molding using a specular mold, cast molding, or precision polishing applicable to optical lenses and the like.

The material of the light guide plate 1 is selected from the light transmitting materials for the lens sheet. Usually, acrylic or polycarbonate resin is used for this purpose.

The thickness of the light guide plate 1 usually ranges from about 1 to 10 μm.

Although it is advisable to use a linear light source, such as a fluorescent lamp, as the light source 3, in order to obtain a uniform luminance throughout the surface, a point light source, such as a incandescent lamp, may be used instead. As shown in FIGS. 6 and 8, the light source 3 is located outside a side end portion of the light guide plate 1 in a separate manner. Alternatively, however, it may be embedded partially or entirely in a recess which is cut in the side end portion the light guide plate 1.

In order to increase the luminance and improve the in-plane uniformity of the luminance, another light source may be provided at the other side end portion of the light guide plate 1.

The source light reflector 5 used may be a conventional one which is formed by depositing metal on the inner surface of a plate in the shape of, for example, a paraboloidal, hyperboloidal, or elliptic cylinder.

The lens sheet 4 is stacked on the smooth surface 10 of the light guide plate 1. In doing this, the gap 9 having the width not smaller than the wavelength λ of the source light is formed at least partially between the lens sheet 4 and the smooth surface 10 of the plate 1 by putting the sheet 4 on the plate surface 10 with its lens surface outward (or on the side remote from the surface 10) and its projection group 41 inward (or on the side of the surface 10), as shown in FIG. 6. The area ratio R of the gap portion 9, which is given by R=(area of region with gap width not smaller than wavelength λ/overall surface area of light guide plate)×100%, is settled depending on the uniformity of the luminance within the desired plane, coefficient of utilization of light energy, light guide plate size, etc. Usually, the ratio R should be adjusted to 80% or more, preferably 90% or more.

Figure 3:
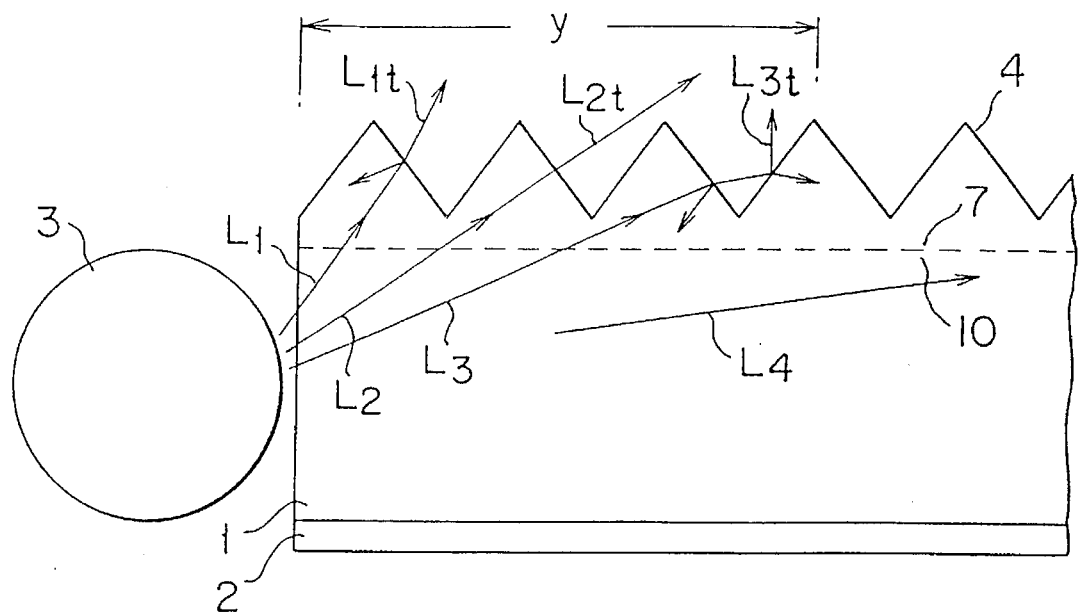
FIG. 3 is a sectional view of the surface light source shown in FIG. 2.
Figure 4:
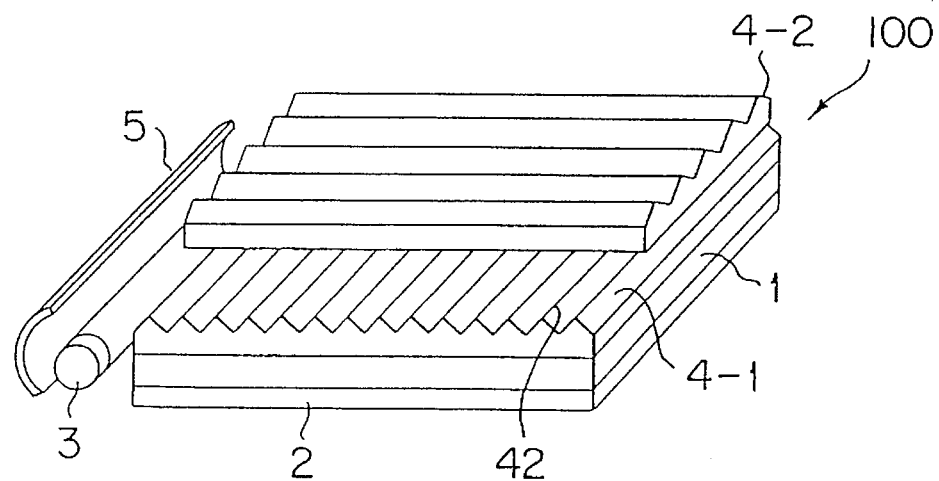
FIG. 4 is a perspective view of a prior art surface light source of the edge-light type having two film lenses stacked in layers.
Figure 5:
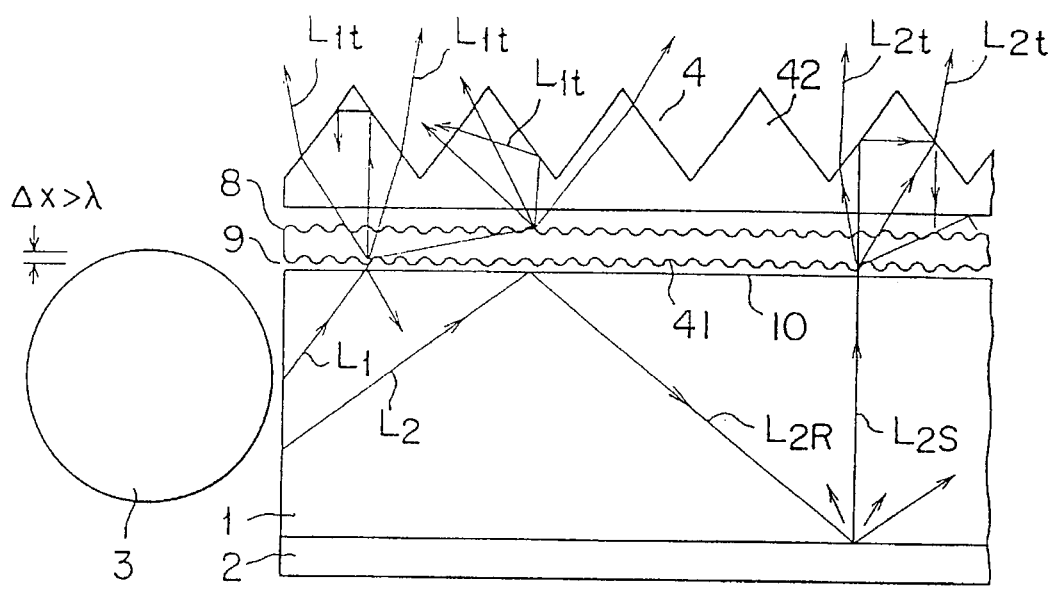
FIG. 5 is a sectional view of a surface light source of the edge-light type according to a first embodiment of the present invention, having a group of projections as a separate layer.

According to an experiment, it is indicated that when the smooth surface 10 of the light guide plate 1, whose roughness is lower than the level corresponding to the wavelength of light, is brought intimately into contact with the surface of the lens sheet 4, as shown in FIG. 3, most of input light beams from the linear light source 3 are emitted without being totally reflected in the region within a distance y from the source-side end portion of the guide plate, and the luminance is considerably lowered in the region beyond the distance y.

Also, it was ascertained that the ratio of the length y of the light emitting portion to the overall length Y of the light guide plate with respect to the light propagation direction is (y/Y)×100=10 to 20%. In order to distribute equally the energy of light from the light source incident upon the light guide plate surface 10 throughout the overall length Y, therefore, 10 to 20% of the light incident upon the surface 10 and the remaining 90 to 80% should be transmitted and totally reflected, respectively. Since there is an approximation, (totally-reflected light volume/transmitted light volume)=(area of region with gap width not smaller than wavelength λ/overall surface area of light guide plate)=R, it was confirmed that R should be 80 to 90% or more.

In forming the gap with the width not smaller than the wavelength of the source light between the lens sheet 4 and the light guide plate 1, the sheet 4 may be oriented (not shown) so that its lens surface and projections 41 face oppositely to the arrangement of FIG. 6.

In this case, however, the light converged once within the desired angle by the lens surface emanates again in an isotropic manner, so that it is difficult to control the light diffusion angle for an optimum value, which ranges from 30° to 60° with respect to the normal line.

The light reflecting layer 2, which tends to reflect light diffusively, may be arranged as follows.

(1) A white layer, containing a high-opacity, high-whiteness pigment, e.g., titanium dioxide or aluminum powder, dispersed therein, is formed on one side of the light guide plate layer by coating or the like.

(2) A matte, fine indentation pattern is formed on the surface of the light guide plate by sandblasting, embossing, etc., and a metal film layer is formed on the patterned surface by depositing a metal, such as aluminum, chromium, or silver, thereon.

(3) A metallic film layer is formed on a low-opacity white layer which is formed by simply coating a matte surface.

(4) A meshed white layer is formed, and its area ratio may be increased with distance from the light source so that attenuation of the light volume of the light source can be compensated.

Figure 9:
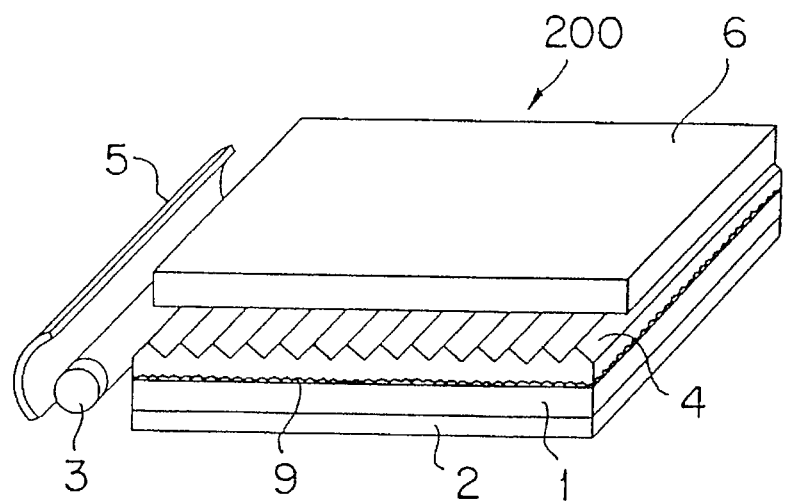
FIG. 9 is a perspective view of the surface light source according to the first embodiment, used as a back-light source of a liquid crystal display unit.
Figure 10:
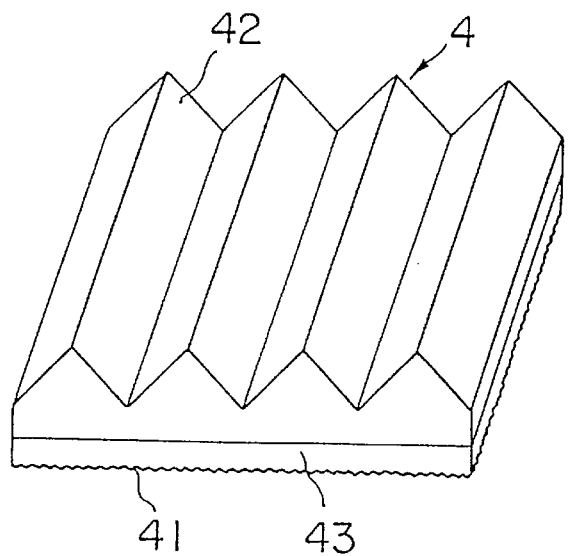
FIG. 10 is a perspective view of a film lens according to a modification of the first embodiment of the invention, having lenticular lenses each in the form of a triangular prism and a group of projections formed as a separate layer on the reverse side thereof.

FIG. 9 shows an arrangement in which a planar light source 100 according to the present invention as a back-light (back-light source) of a light transmitting display unit 6, such as a light transmitting LCD. In this case, it is necessary only that the unit 6 be stacked on the lens surface (on which the unit lenses 42 are arranged) of the lens sheet of the light source 100.

The distribution of the light from the surface light source can be evaluated effectively on the basis of the diffusion angle.

For example, a half-angle $\theta_H$ is used as the diffusion angle. This angle is defined as $\theta_H$ given by $I(\theta_H)=I(O)/2$, where $I(\theta_H)$ is the transmitted light luminance (or intensity) as a reduction function of an angle θ to the normal line of the light emitting surface.

[Operation of the First Embodiment]

Figure 1:
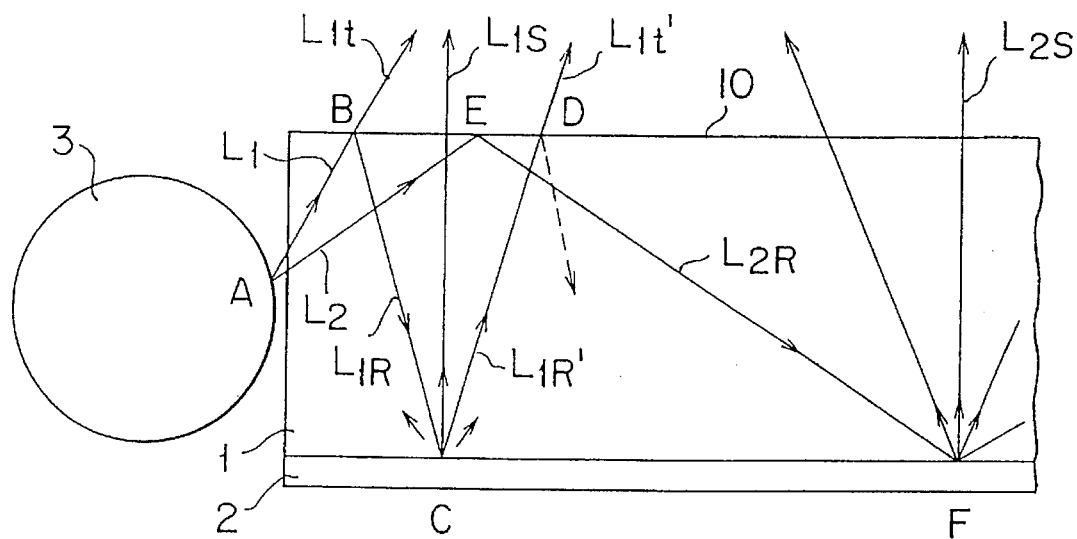
FIG. 1 is a sectional view of a prior art surface light source of the edge-light type having no film lens.

In the surface light source of the edge-light type described above, the angle of incidence (angle between the surface 10 and the normal line) of a light beam L1 incident in the vicinity of the light source 3, among other light beams from the light source 3 incident directly upon the smooth surface 10 of the light guide plate 1, becomes narrower than the critical angle, so that a certain proportion of the incident light is emitted as a transmitted light beam L1T, as shown in FIG. 1. As a result, an emitted light beam is formed in the vicinity of the light source. On the other hand, a light beam L2 from the light source 3 incident directly upon a relatively remote point has a wide incident angle greater than the critical angle, so that it is propagated as a totally reflected light beam L2R to a more remote point without being radiated to the outside. Further, the light beam L2R is reflected by the diffuse reflecting layer 2 on the reverse side of the light guide plate 1, thus forming diffused (or disturbed) reflected light beams L2S, which advance in all directions. Some of these reflected light beams L2S are incident at an angle narrower than the critical angle upon the surface 10, and some of these incident light beams constitute an emitted light beam. In this manner, the emitted light beam is formed at the point remote from the light source.

FIG. 3 shows a state in which the lens sheet 4 is stacked on the smooth level surface 10 of the light guide plate 1 so that its non-lenticular surface or smooth surface 7 is in contact with the surface 10. Any of the refractive indexes of light transmitting materials used normally are about 1.5, there are no substantial differences between them. From an optical point of view, therefore, the lens sheet 4 and the light guide plate 1 are substantially integral with each other, as shown in FIG. 3. Since the surface of each unit lens 42 of the lens sheet 4 is inclined with respect to the smooth surface 10, most of the light beams incident upon the light guide plate 1 in the vicinity of the light source, e.g., light beams L1, L2 and L3, are incident at an angle narrower than the critical angle. Thus, a certain proportion of these light beams is radiated entirely, and most of the reflected light beams are returned toward the light source without being propagated to distant places.

Naturally, there are light beams, e.g., L4 of FIG. 3, which are emitted from the light source and landed directly on remote points on the lens surface. The volume of these light beams, however, is smaller than in the case of FIG. 1.

As mentioned before, therefore, most of the emitted light beams from the surface light source are inevitably concentrated on that region of the light guide plate near the light source which accounts for 10 to 20% of the total area.

According to the present invention, on the other hand, the projections 41 are formed on the non-lenticular surface of the lens sheet 4, whereby the gap 9 is formed at least partially between the smooth surface 10 of the light guide plate 1 and the sheet 4, as shown in FIG. 6.

At the gap portion 9, the light guide plate 1, usually having the refractive index of about 1.5, and an air (or vacuum) layer with the refractive index of about 1.0 adjoin each other with the surface 10 as an interface, so that total reflection of light occurs in the same manner as in the case of FIG. 1. In the region near the light source, therefore, the emitted light beam is obtained from the transmitted light beam L1T which is incident at an angle narrower than the critical angle upon the surface 10. In the region remote from the light source, on the other hand, the light is totally reflected by the interface of the gap portion 9, and thereafter, an emitted light beam is obtained from components L2T with an angle of incidence narrower than the critical angle, among the light beams diffusively reflected by the diffuse reflecting layer 2 on the reverse side.

Naturally, some of the light beams L2T incident upon the region in which the projections 41 are in contact with the surface 10 are transmitted entirely to become an emitted light without being reflected. If the area ratio R of the gap portion 9 ranges from 80 to 90% or more, a substantially uniform luminance distribution can be obtained throughout the surface, as mentioned before.

Moreover, the total reflection by the surface 10 can be secured by making the height of the projections (or the width of the gap portion) not smaller than the wavelength of the source light.

Figure 17:
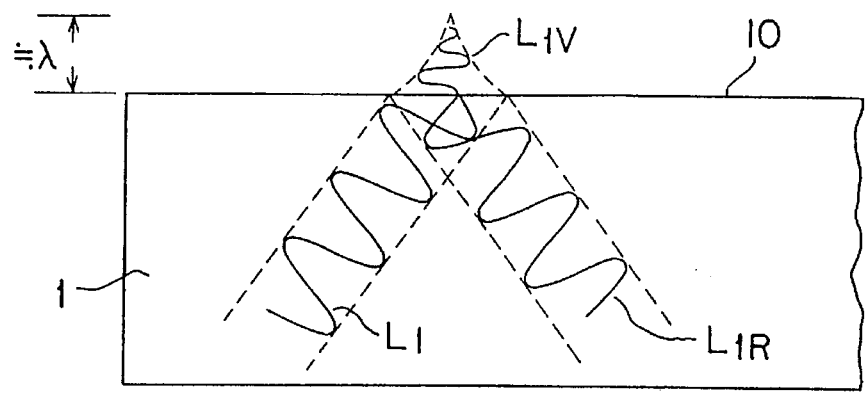
FIG. 17 is a sectional view illustrating the behavior of a light beam advancing outward from inside a light guide plate.

The following is the reason for this. In the case where the light beam L1 emitted from inside the light guide plate 1 and landed on the smooth surface 10 of the plate 1 is totally reflected to become a reflected light beam L1R, as shown in FIG. 17, an electromagnetic field L1V of light transmitted through the interface 10 by the tunnel effect exists in the air (or vacuum) layer, to be exact. The electromagnetic field L1V, which attenuates exponentially, substantially shares the order with the wavelength of the light, and its amplitude is zero.

If the width of the gap portion 9 is great enough and larger than the wavelength of the light, therefore, the light beam L1 practically cannot enter the gap portion 9.

Figure 18:
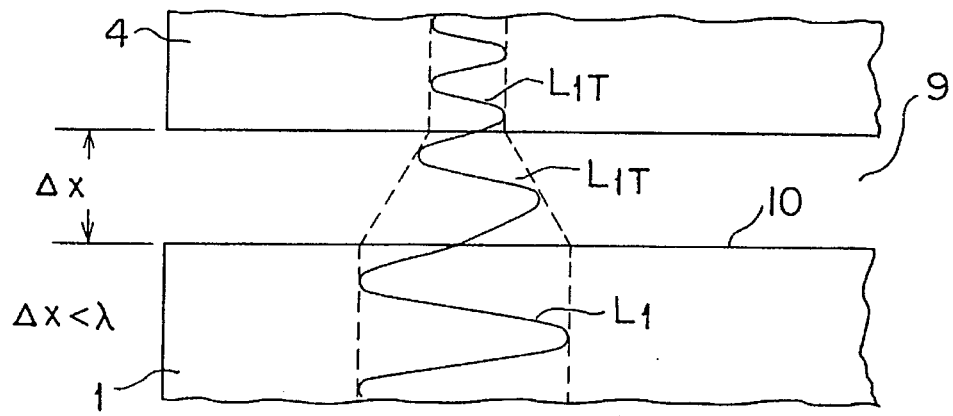
FIG. 18 is a sectional view illustrating the way a light beam coming from the light guide plate by the tunnel effect becomes traveling waves again.

When the lens sheet 4, which has substantially the same refractive index as the light guide plate 1, is situated at a distance $\Delta x$ shorter than the wavelength $\lambda$ of the source light from the surface 10 of the plate 1 ($\Delta x < \lambda$), as shown in FIG. 18, however, the electromagnetic field L1V, having entered the lens sheet 4 without having been entirely attenuated, becomes traveling waves or transmitted light beam L1T again.

Figure 19:
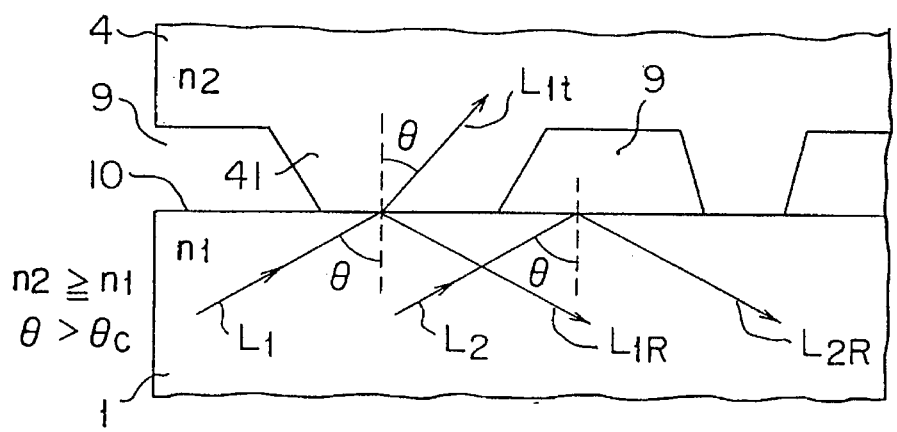
FIG. 19 is a sectional view of a film lens according to a further modification of the first embodiment of the invention, illustrating the way a part of the light beam advancing outward from the light guide plate is totally reflected and the remaining part is transmitted.
Figure 20:
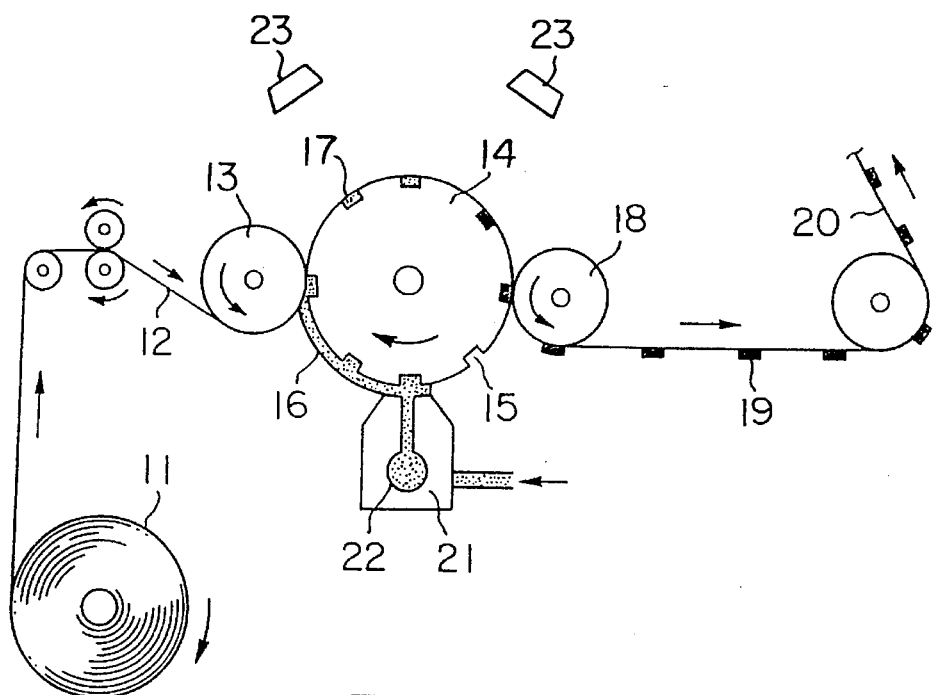
FIG. 20 is a diagram for illustrating a manufacturing method according to an example of the first embodiment of the present invention.

Since the projections 41 are formed on the reverse side of the lens sheet 4, according to the present invention, the area between the light guide plate 1 and the lens sheet 4 includes gapped regions and gapless regions where the plate 1 and the sheet 4 are optically integral with each other (or there are gaps with a width smaller than the wavelength of the light), as shown in FIG. 19.

The incident light is totally reflected in the gapped regions, while it is transmitted in the gapless regions. As mentioned before, the volume of the light totally reflected by the surface 10 depends on the ratio of the gap portion area to the overall area of the light guide plate.

[Advantage of the First Embodiment]

When the lens sheet of the present embodiment is placed on the smooth surface of the light guide plate of the surface light source of the edge-light type, the gap with the width not smaller than the wavelength of the source light can be securely formed between the lens sheet and the light guide plate, due to the projections on the reverse side (opposite to the lens surface).

Thus, the lens sheet can be placed on the surface of the light guide plate without hindering the uniform distribution of the source light to the inside of the whole guide plate by the total reflection of the light on the plate surface.

Moreover, the surface light source of the edge-light type according to the present invention, using the lens sheet of the invention, can secure uniform luminance within a desired angular range, and also provide a uniform luminance distribution throughout the surface without the concentration of the luminance in the vicinity of the light source.

[Example 1]

(Lens Molding Process)

Figure 2:
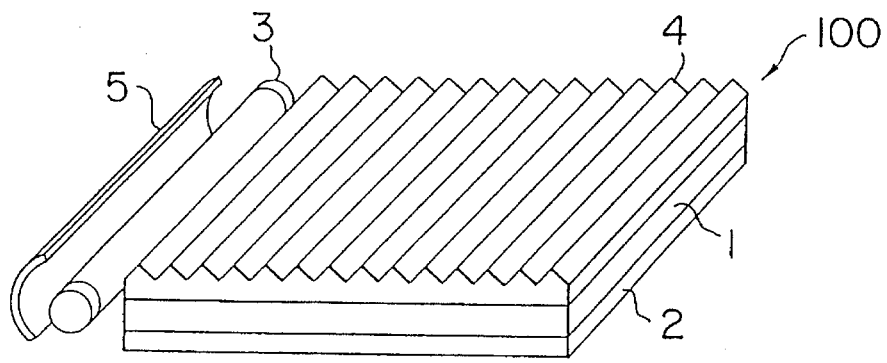
FIG. 2 is a perspective view of a prior art surface light source of the edge-light type having a film lens with a smooth reverse-side surface.

A lens was manufactured in the following processes using an apparatus shown in FIG. 2.

(1) A take-up roll 11 for a colorless, transparent, bi-oriented base film 12 of polyethylene terephthalate with a thickness of 100 μm was prepared.

(2) A roll-shaped intaglio 14 was prepared by engraving the surface of a metallic cylinder with an inverted mold 15 (having the same shape and a reverse profile) in the form of a cylindroid lenticular lens. While this intaglio 14 was rotated around its central axis, an ultraviolet-curing liquid resin 16 was fed onto the intaglio surface, whereby the uneven surface of the inverted mold for the lens was filled and coated.

(3) Then, the base film 12 was delivered from the take-up roll 11 at a speed synchronous with the peripheral speed of the roll-shaped intaglio 14, and was bonded to the intaglio 14 with the liquid resin between them. In this state, ultraviolet rays from mercury vapor lamps 23 were applied to the resulting laminate from the base-film side, whereby the liquid resin was crosslink-cured in the inverted mold, and at the same time, bonded to the base film.

(4) Subsequently, the traveling base film was separated together with the cured resin with a lens shape pattern 19 thereon by means of a separating roll 18, whereupon a cylindroid lenticular lens sheet 20 was obtained. This lens sheet was rolled up as it was.

Lens shape: See FIG. 21.
Unit lens shape: Cylindroid (with major axis in normal direction of lens sheet).
Major axis length: $2b=104$ μm.
Minor axis length: $2a=150$ μm.
Major axis length/minor axis length: $2b/1a=1.36$.
Repetition cycle of lens unit: $p=130$ μm.
Main components of ultraviolet-curing liquid resin:
Polyfunctional polyester acrylate oligomer,
Optical reflection initiator.

(Projection Molding Process)

(1) A roll-shaped intaglio was prepared by engraving the surface of a metallic cylinder with an inverted mold for a minute pear-skin projection group.

(2) Then, the lens sheet manufactured in the lens molding process was unwound from the take-up roll, and a group of minute pear-skin projections of an ultraviolet-curing resin was molded by using the same apparatus and liquid resin as the ones used in the lens molding process.

Figure 21:
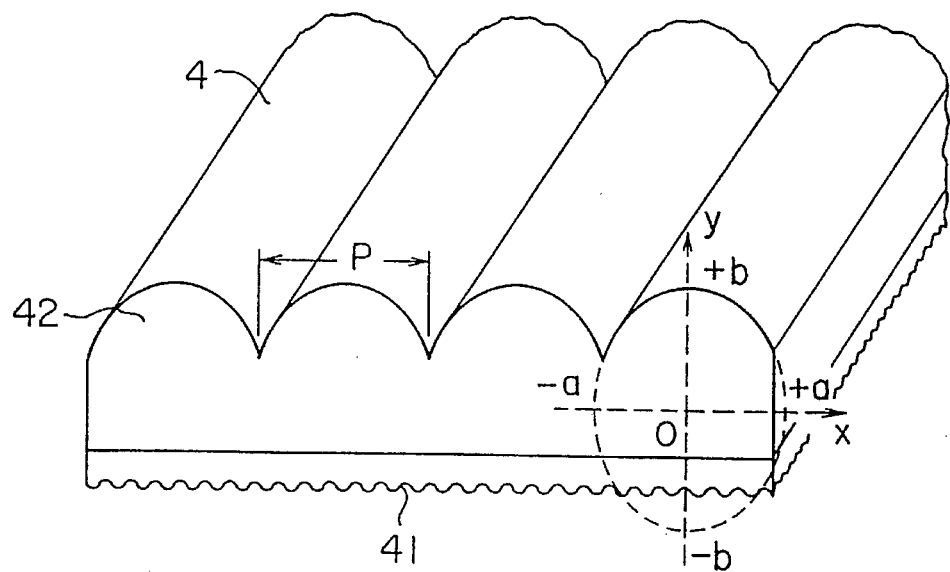
FIG. 21 is a sectional view of a film lens according to an example of the first embodiment of the invention, having cylindroid lenticular lenses.

(3) Thus, a lens sheet according to the present invention, such as the one shown in FIG. 21, was obtained.

Minute projection group
Overall coating thickness: 2.0 μm.
Surface roughness (ten-point average roughness provided by JIS-B-0601): $Rz=0.8$ μm.

[Example 2]

A surface light source of the edge-light type with the construction shown in FIG. 8 was obtained by using the cylindroid lens sheet manufactured according to Example 1.

Light guide plate
Material: Polymethyl acrylate resin.
Shape: Rectangular prism (4 mm thick).
Obverse side: Finished to smoothness such that the center-line average roughness Rz was less than 0.1 μm throughout the surface.
Reverse side: Printed with circular mesh patterns of matte, transparent ink, and coated with a reflective mirror film composed of aluminum deposited on a polyethylene terephthalate film by vacuum spraying. The mesh patterns are formed by silk screen printing using impalpable powder of silica dispersed in an acrylic resin binder. The mesh patterns were arranged longitudinally and latitudinally with a repetition cycle of 5 mm. The diameter of the mesh patterns, which was increased in proportion to the distance from the light source, was 0.1 mm in the region near the light source, and 2 mm at the end portion more remote from the light source.

Light source
A white fluorescent lamp as a linear light source was disposed at one end of the light guide plate.
A metallic reflector was placed on the side opposite to the light guide plate.
The surface light source constructed in this manner has the following characteristics.
Half-angle: 36°
Normal-direction luminance (central portion of light guide plate): 2,028 cd/m².
Distribution of normal-direction luminance in light emitting surface: Within ±5%.
Substantially uniform by visual observation.

[Comparative Example]

In an arrangement similar to Example 2, a lens sheet without any projections on its reverse side was used. The reverse side of the lens sheet, which constitutes the surface of a base film itself, was finished to a smooth surface with the ten-point average roughness Rz of less than 0.1 μm.

For other particulars, this example is arranged in the same manner as Example 2.

According to the surface light source constructed in this manner, although the luminance with respect to the direction normal to the light emitting surface was high in the vicinity of the source-side end portion, it was drastically lowered with distance from the light source. At a distance of 2 cm from the light source, the luminance was so low that visual darkness was felt.

[Second Embodiment]

Figure 22:
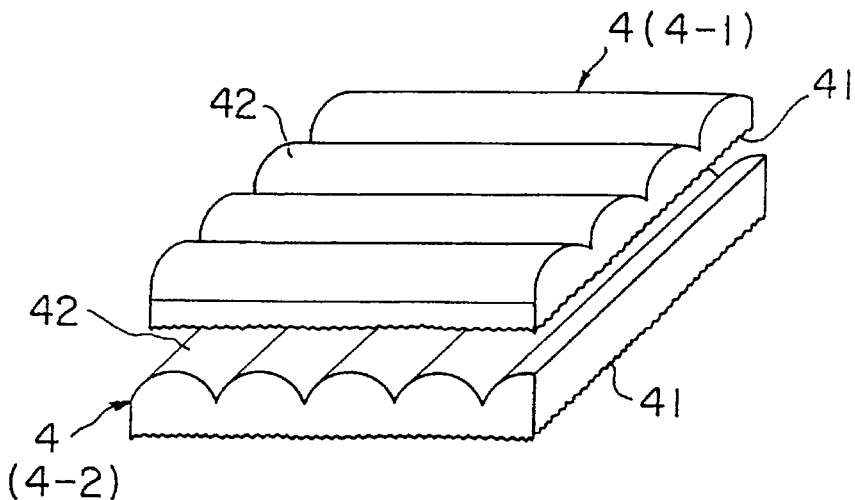
FIG. 22 is a perspective view of a film lens according to a second embodiment of the present invention.
Figure 23:
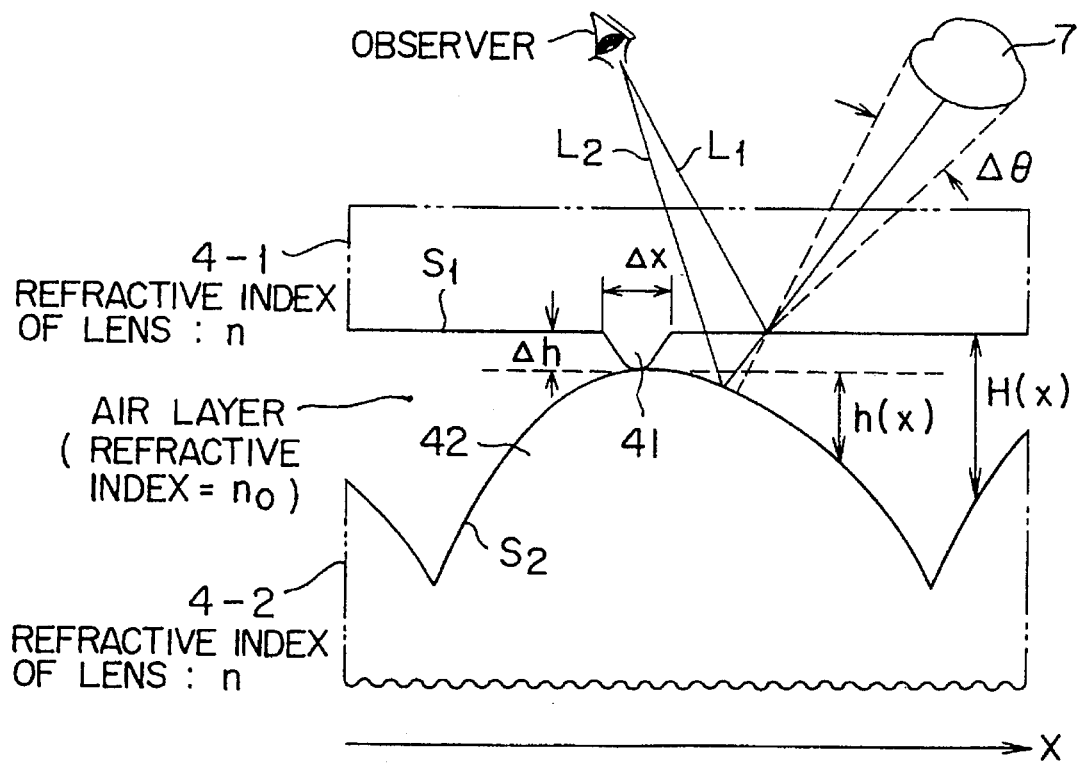
FIG. 23 is a diagram for illustrating the principle of the film lens according to the second embodiment of the invention.
Figure 24:
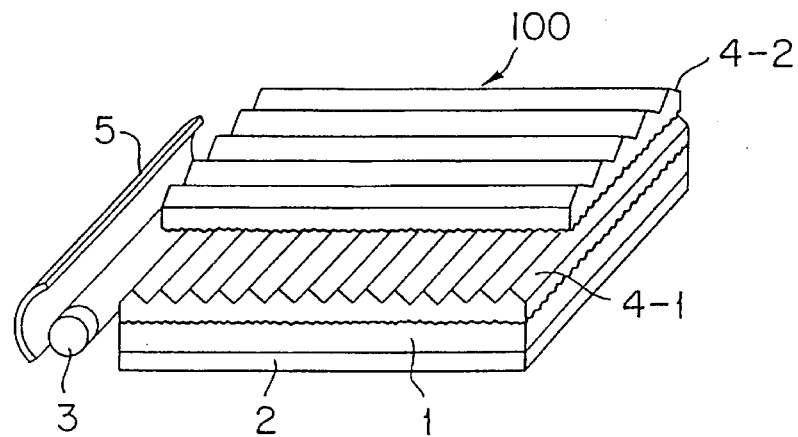
FIG. 24 is a perspective view of a surface light source of the edge-light type according to a second embodiment of the invention.

FIG. 22 is a perspective view of a film lens according to a second embodiment of the present invention, FIG. 23 is a diagram for illustrating the principle of the film lens according to the second embodiment, and FIG. 24 is a perspective view of a surface light source of the edge-light type using the film lens according to the second embodiment. In the description to follow, like reference numerals refer to like portions which function in the same manner as in the conventional cases.

Formed on the surface of the film lens according to the second embodiment is a group of cylindrical (cylindroid in the case shown in FIG. 22) unit lenses 42 (lenticular lenses in a broad sense) which are adjacently arranged with their respective ridges parallel to one another.

Minute projections 41 are formed on the reverse side of the film lens 4. The height Δh of each projection 41 is given by $$\Delta h \geq \lambda_{max}/2\Delta\theta^2 \quad (1)$$

where $\lambda_{max}$ is the maximum wavelength of the visible spectrum of a light source for the observation of the film lens 4, and $\Delta\theta$ is the angular radius of the light source aw viewed through a reflective surface of the film lens 4.

The minute projections 41 are arranged noncyclically in one- and two-dimensional modes, and the width Δx of each projection 41 is given by $$\Delta x \leq 100 \ \mu m. \quad (2)$$

Moreover, the average distance d between each two adjacent minute projections 41 is given by $$d < 2P \quad (3)$$

where P is the arrangement cycle of the unit lenses 42.

In the present embodiment, as shown in FIG. 22, two film lenses 4-1 and 4-2 of the same construction are stacked in layers so that their respective ridges extend at right angles to each other. As shown in FIG. 24, the light guide plate 1, reflecting layer 2, light source 3, source light reflector 5 are combined to be used as a surface light source 100.

The following is a description of the height of the minute projections 41 on the reverse side of each film lens 4 according to the present embodiment and a condition for disappearance of interference fringes of equal thickness on the laminate surface of each film lens.

In the present embodiment, as shown in FIG. 23, the minute projections 41 are arranged on the reverse side of the obverse-side film lens 4-1 so that a gap $H_{(x)}$ between the film lenses 4-1 and 4-2 is widened. Thus, interference fringes of equal thickness (higher-order concept of Newton's rings) can be restrained from being produced by interference between light beams L1 and L2 reflected by interfaces S1 and S2, respectively.

It should be taken into consideration that the entire interference fringes of equal thickness are produced as a result of superposition of interference fringes of equal thickness on the minute projections 41 and ones in other regions (peripheral portions).

In connection with the interference fringes of equal thickness in the other regions (peripheral portions) than the minute projections 41, the thickness $H_{(x)}$ of the gap layer (air layer) is the sum of a thickness $h_{(x)}$ obtained when the film lenses 4-and 4-2 are stacked directly in contact with each other and the height $\Delta h$ of each projection 41, that is, $H_{(x)}$ is $$H_{(x)} = h_{(x)} + \Delta h. \quad (4)$$

Since $\Delta h > 0$ is given, we obtain $$H_{(x)} \geq \Delta h > 0 \quad (5)$$

even though $0 \leq h_{(x)}$ is given (that is, though $h_{(x)}$ gradually approaches zero). Thus, $H_{(x)}$ ceases to approach zero.

The interference fringes of equal thickness disappear as the thickness H of the gap portion increases. The lower limit value of the increased thickness H with which the interference fringes of equal thickness disappear is obtained, and it is substituted for expression (5). The result is the condition for disappearance of the interference fringes of equal thickness at the peripheral portions of the minute projections 41. This condition is calculated as follows. According to "Wave Optics" (by H. Kubota, 4th issue, Aug. 30, 1975) pp. 87–89, it is ascertained that interference fringes of equal thickness are recognized if there is a relation $$\Delta\theta < (\lambda/2H)^{1/2} \quad (6)$$

where $\Delta\theta$ (radian) is the angular radius of an external light source 7 as externally viewed through reflective surfaces S1 and S2 of film lenses 4, $\lambda$ (μm) is the wavelength of the source light, and H (μm) is the gap thickness, in the case where the light source has a spatial extent. According to expression (6), a condition in which the interference fringes of equal thickness are invisible (or in which no interference fringes are produced) is obtained as follows:

$$H_{(x)} \geq \lambda/2\Delta\theta^2 \quad (7)$$

Substituting expression (7) for expression (5), it is ascertained that the height $\Delta h$ of the minute projections 41 should only fulfill the following requirement.

$$\Delta h \geq \lambda/2\Delta\theta^2 \quad (8)$$

The above description is related to the case of a monochromatic light source. In the case of a light source which has a conventional emission spectrum distribution, expression (8) is proportional to $\lambda$. If the maximum value $\lambda_{max}$ of the spectrum distribution, out of the light source spectrum ($\lambda_{min} \leq \lambda \leq \lambda_{max}$), satisfies expression (8), therefore, then all the remaining values for $\lambda$ do so. Thus, expression (1), $\Delta h \geq \lambda_{max}/2\Delta\theta^2$, is the condition for the height of the minute projections 41 for the light source which has the spectrum distribution.

According to expression (1), a specific value is obtained as follows. Here let it be supposed that the surface of each film lens 4 is observed with use of a white light with 0.38 (μm) $\leq \lambda \leq$ 0.78 (μm) as the external light source 7, and that the angular radius of the light source 7, e.g., ordinary indoor lighting or natural light through a window, is given by $10° \leq \Delta\theta \leq 120°$, that is, 0.175 (rad) $\leq \Delta\theta \leq$ 2.094 (rad). Thereupon, we obtain $$\Delta h \geq 12.5 \ (\mu m) \quad (9)$$

as a value corresponding to $\Delta\theta = 0.175$ (rad) and $\lambda = 0.78$ (μm), according to expression (1).

The following conditions are added to the minimum necessary conditions given by expressions (8), (1) and (9).

If each film lens 4 is formed of a fully rigid body, then it is necessary only that it be supported by means of three projections which are not situated on the same straight line, that is, which constitute the vertexes of a triangle.

In the case where each film lens 4 is formed of a thin, flexible material, such as a synthetic resin, however, it is deflected in the region covered by the minute projections 41 if the projections 41 are arranged at too long intervals. In this case, $h_{(x)}$ and $H_{(x)}$ cannot meet the conditions given by expressions (8), (1), (9) and (5).

To avoid this, therefore, the minute projections 41 on the reverse side of each film lens 4 of this type are arranged close enough to satisfy the conditions given by expressions (8), (1), (9) and (5) despite the deflection. In general, the minute projections 41 are distributed two-dimensionally with a density not lower than twice the arrangement cycle P of the unit lenses 42 of the lower film lens 4-2, preferably not higher than ½.

In other words, it is necessary only that the average distance d between each two adjacent minute projections 41 meet the condition given by expression (3), d<2P, where P is the arrangement cycle of the unit lenses 42.

Referring now to FIG. 25, the condition of expression (3) will be described further. For simplicity, let it be supposed that each three adjacent minute projections A, B and C form an equilateral triangle $\triangle ABC$, and the unit lenses 42 of each film lens 4 are arranged only linearly (one-dimensionally). In this case, if the minute projections A and B come into contact with the unit lenses 42-1 and 42-3, respectively, with the distance AB, BC or CA between each two adjacent projections equal to 2P, as shown in FIGS. 25A and 25B, the unit lens 42-2 appears to be in contact with no minute projection between the projections A and B with respect to the x-axis only. Two-dimensionally, however, the lens 42-2 is supported by a minute projection C at a distance in the y-axis direction.

Figure 25A:
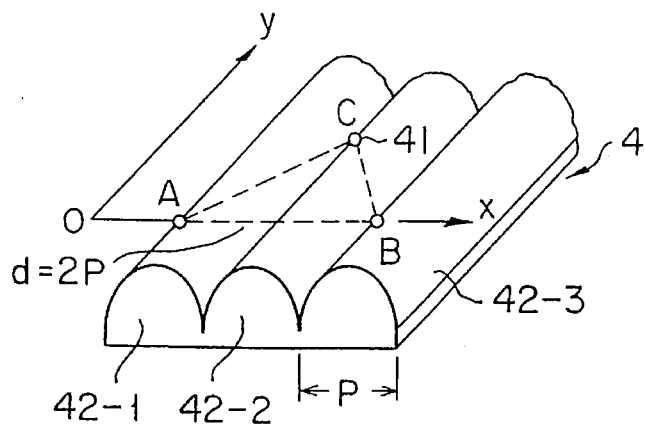
FIGS. 25A, 25B, 25C and 25D are diagrams for illustrating the relationships between projections and unit lenses.
Figure 25B:
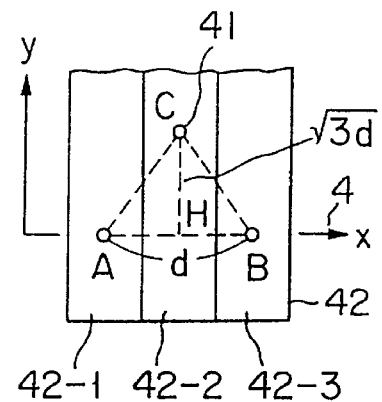
Figure 25C:
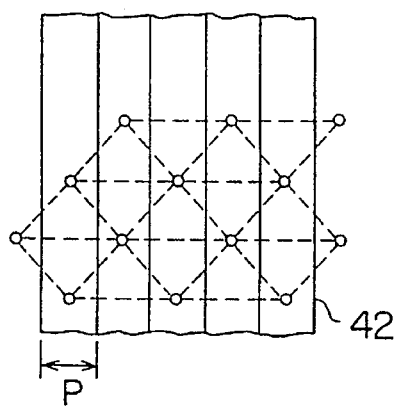
Figure 25D:
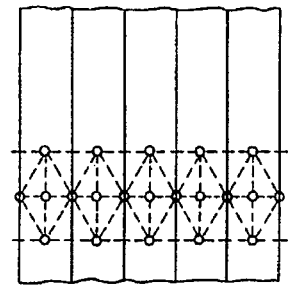

In this arrangement, every unit lens 42 is supported by three-point-support structures each including three minute projections 41 without exception, as shown in FIGS. 25C and 25D, so that the area of contact between the film lenses 4-1 and 4-2 due to deflection can be minimized.

According to an experiment, moreover, it was ascertained that if d exceeds 2P, interference fringes of equal thickness start to be visually observed even though expressions (1) and (2) are satisfied by Δh and Δx, respectively. Thus, the condition of expression (3) is obtained.

In this arrangement, every two unit lenses 42 are practically supported by one block of minute projections 41, so that there is no influence of the deflection. If the average distance d is too small, that is, if the minute projections 41 are arranged too close, however, the diffusion angle of the emitted light becomes too wide. It is advisable, therefore, to select a suitable range for the distance d.

The following is a description of the interference fringes of equal thickness on the minute projections 41. In the regions near the minute projections 41, $H_{(x)}$ converges to zero, so that interference fringes of equal thickness are unavoidable. Practically, the interference fringes of equal thickness can be avoided by distributing the minute projections 41 at random without any one- or two-dimensional cycles, and reducing the width Δx of each minute projection 41 to an invisible size.

In this arrangement, interference fringes of equal thickness, if any, cannot be visually observed, since they exist only locally in the regions of the minute projections 41.

If the minute projections 41 are arranged cyclically, however, they never fail to come into contact with the unit lenses 42 in certain cycles. If they are observed from a distance, therefore, minute interference fringes of the projections 41 are integrated into visible interference fringes.

If the minute projections 41 are arranged noncyclically, the brightnesses of the microscopic interference fringes of the projections 41 are integrated at random into zero, as observed from a distance, and cannot be visually recognized.

Practically, therefore, the object can be achieved by adjusting the width Δx of the minute projections 41 to about 100 μm or less. Thus, it is necessary on that expression (2), $\Delta x \leq 100$ μm, be satisfied.

Preferably, the minute projections 41 should be colorless and transparent, and may be formed by the embossing method in which the reverse side of the film lens 4 is heat-pressed, machining method such as sandblasting, casing method using a transparent resin, or method in which a coating material prepared by dispersing transparent minute particles in a transparent binder is applied by spraying, roll coating, or the like.

Preferably, acrylic beads or polycarbonate beads of 15 to 30 μm may be used as the transparent minute particles. The beads of this size are used because the film lens cannot be transparent if the particle size is less than 15 μm, and lacks in printability and coating properties if the particle size is more than 30 μm.

The refractive index of the beads preferably ranges from about 1.00 to 1.60, and the density of the beads preferably ranges from 2 to 5% of the binder resin content. The binder resin used is transparent, and its refractive index ranges from about 1.00 to 1.60. Since the binder resin is not intended to refract light, it is advisable to approximate its refractive index to that of the beads as close as possible. Acrylic resin, polystyrene, polyester, vinyl copolymers, etc. may be used for this purpose.

In an alternative method, a coating material prepared by dispersing other transparent minute particles than the acrylic beads, such as calcium carbonate, silica, or acrylic resin, in a transparent binder is applied so that the surface of the resulting coating film has indentations attributable to the minute particles thereon. According to a further alternative method described in Jpn. Pat. Appln. KOKAI Publication No. 3-223883 and U.S. Pat. No. 4,756,850, an ultraviolet- or electron-radiation-curing liquid resin is molded on a roll intaglio so that the resulting surface is matte, having minute indentations.

Further, the minute projections 41 can restrain the production of interference fringes of equal thickness without spoiling the function of the film lens 4. If they are arranged at random, the projections 41 can prevent the production of moire fringes when combined with liquid quartz cells. Furthermore, minute projections 41 can make obscure reflecting dots printed on an acrylic sheet for back-lighting.

It is to be understood that the present invention is not limited to the embodiments described above, and that various changes and modifications may be effected therein by one skilled in the art without departing from the scope or spirit of the invention.

For example, the lens sheet 4 according to the present invention may be composed of a group of cylindrical unit lenses 42 (lenticular lenses in a broad sense) adjacently arranged with their respective ridges parallel to one another, as shown in FIG. 7, or of an ommateal lens including a number of protuberant unit lenses 42, e.g., each in the form of a hemispherical projection having an independent circumference, which are arranged in a two-dimensional manner.

The profile of each unit lens 42 may have the shape of a continuous smooth curve, e.g., circular, elliptic, cardioid, Rankine's-egg-shaped, cycloid, or involute, as shown in FIGS. 13 and 14. Alternatively, the profile may be formed of part or whole of a polygon, such as a triangle, tetragon, or hexagon, as shown in FIG. 7.

Each unit lens 42 may be convex, as shown in FIG. 13, or concave, as shown in FIG. 14. Preferably, the unit lens should be shaped like a circular or elliptic cylinder in consideration of ease of design and manufacture, light condensing capability, light diffusion properties (half-angle, scarcity of side-lobe light (peak of luminance in oblique direction), isotropy of in-half-angle luminance, normal-direction luminance, etc.), and the like. An ellipse whose major axis extends in the normal direction of a surface light source is a particularly preferable configuration, since it ensures high luminance. Preferably, the ratio of the major axis length to the minor axis length ranges from 1.27 to 1.85, in particular.

Although the film lens 4 may be used singly, two film lenses 4-1 and 4-2 may be arranged in layers such that their respective ridges cross at right angles, as shown in FIG. 16, in order to control light diffusion angles in two directions (vertical and crosswise) by means of the cylindrical lenses. In this case, the best optical transmission can be obtained if the respective lens surfaces of the two lenses face in the same direction, as shown in FIG. 16. Naturally, however, the film lenses 4 may be arranged so that their lens surfaces face each other. In this case, the minute projections 41 are formed on one of the lens surfaces. Alternatively, moreover, the film lens 4 may be obtained by integrally molding a light transmitting base material, as shown in FIG. 7, or by forming unit lenses 42 on a light transmitting plate (or sheet) 44, as shown in FIG. 11.

The light transmitting base material for each film lens 4, thickness of the lens 4, lens shaping method, and optical transmission of the lens are the same as the ones described in connection with the first embodiment. Moreover, the projections 41 may be modified in the same manner as in the first embodiment.

The film lens 4-2 is placed on the smooth level surface 10 of the light guide plate 1 in a manner such that the lens surface of the lens 4-2 and the minute projections 41 face outward (on the side opposite to the smooth surface) and inward (on the smooth-surface side), respectively. In this case, the height of the minute projections between the film lens 4-2 on the light guide plate 1 and the smooth surface 10 of the plate 1 should be made greater than the maximum wavelength $\Lambda_{max}$ of the source spectrum of the light source 3 of the surface light source, that is, $$\Delta h \geq \Lambda_{max} \qquad (10)$$

must be satisfied for the following reason.

If the width of at least part of the gap 9 is made greater than the wavelength Δ of the source light, a partial air layer (with a refractive index lower than that of the light guide plate 1) is formed between the guide plate 1 and the reverse side of the film lens 4. Light is totally reflected by the interface between the air layer and the obverse side of the light guide plate 1, and is distributed to more remote portions (with respect to the light source 3) of the plate 1 without being emitted through the interface. On the other hand, light is transmitted and emitted to the outside through those portions in which the light guide plate 1 and the minute projections 41 on the reverse side of the film lens 4 are directly in contact with one another. Thus, the volume of light delivered from the obverse side of the light guide plate 1 is balanced with the volume of light distributed to every corner of the plate 1, so that the resulting surface light source can enjoy a uniform luminance throughout the surface. In normal indoor service conditions, expressions (1) and (10) share common terms. If the film lens of the present invention is also applied to the film lens 4-2, therefore, it is expected to satisfy both of expressions (1) and (10).

Subsequently, the film lens 4-1 of the present invention is placed on the film lens 4-2 in the manner shown in FIG. 2.

The light reflecting layer 2, which serves to reflect light diffusively, can be constructed in the same manner as in the first embodiment.

[Example]
Materials
Base material: A transparent bond layer was applied to a transparent bi-oriented PET film (100 μm thick) to a thickness of about 1 μm, and an ultraviolet-curing resin consisting mainly of a prepolymer of urethane acrylate was applied to form a pattern for the unit lenses 42. After the resin coating film was cured (or solidified) and released from the mold, a linear film lens was obtained in which unit lenses, each in the form of an elliptic cylinder (major axis length/minor axis length=1.85), are arranged adjacent to one another at pitches of 110 μm so that their respective ridges extend parallel to one another, as shown in FIG. 13.

Minute projections were formed on the that surface of the film lens opposite to the lens forming surface in the following manner.

Composition
Beads: Crosslinked acrylic resin beads (MBX-20 from Sekisui Kaseihin Kogyo Co., Ltd.) with particle diameter of 20 μm.
Binder: Chemical X-MD Medium (mixture of vinyl chloride-vinyl acetate copolymer and acrylic resin) from Showa Ink Kogyo Co., Ltd.
Antistatic agent: DEHYDAT 80X from Henkel Hakusui Co., Ltd.

Manufacturing process
Ink containing the beads and the antistatic agent which account for 3% and 20%, respectively, of the binder resin content was diluted with a solvent with MEK: toluene: IPA=2:2:1. The viscosity of the ink was adjusted to 17 seconds as measured by means of a viscometer #3. This ink was applied to the non-lenticular surface of the base material by the gravure coating method (using a solid set-angle gravure with 48 lines/cm photoengraved by means of an electronic engraving machine). Thereafter, the solvent was dried to solidify the coating film. Minute projections with the height Δh ranging from 15 to 20 μm were arranged at random on the coating film, with the average interval d of 150 μm.

[Advantage of the Second Embodiment]
According to the film lens of the present embodiment, as described above, the minute projections are arranged on its reverse side (opposite to the lens surface) with a predetermined size distribution, so that interference fringes of equal thickness can be restrained from being formed on the reverse side.

[Third embodiment]
In some cases, dust may adhere to the film lens in a film lens manufacturing process or a process for incorporating the film lens into the surface light source or a display unit. As a result, the optical properties of the surface light source or display unit or the image quality may be deteriorated.

If the film lens is loaded with the antistatic agent in order to avoid this, the transparency and optical uniformity of the lens are inevitably lowered. The deterioration of the optical properties of the surface light source or the image quality is marked if graphite or metal foil pieces, which produce a high antistatic agent effect, are used as the antistatic agent. Conventionally, therefore, it has been difficult to reconcile the antistatic agent effect and the optical properties of the film lens.

The object of the third embodiment is to provide a film lens which can secure the antistatic agent effect without lowering the optical properties, such as the optical transmission, uniformity, etc.

According to this third embodiment, the minute indentations (projections) loaded with the coating material which contains the antistatic agent are discretely formed on the reverse side of the film lens. In other words, the minute indentations or projections, not the film lens itself, are loaded with the antistatic agent, and are arranged discretely. Thus, the film itself is not loaded with the antistatic agent, so that an antistatic agent effect can be secured by means of the antistatic agent in the projections without lowering the optical properties, such as the optical transmission, uniformity, etc.

When using a high-transparency antistatic agent (e.g., surface active agent), all the minute projections may be loaded with it.

When using a low-transparency antistatic agent (e.g., graphite, metal powder, or metal foil pieces), however, it is advisable to load only some of the minute projections on the reverse side of the film lens with the antistatic agent.

In order to reconcile the antistatic agent function and the transparency, the covered area ratio of those projections on the reverse side of the film lens covered by the coating material loaded with the antistatic agent ranges from 1 to 65%. The remaining projections are not loaded with the antistatic agent.

Discrete patterns of the projections covered by the antistatic agent-loaded coating material may be mesh patterns (circular, elliptic, tetragonal, or hexagonal) or line groups (parallel lines or lattices composed of parallel lines intersecting at right angles or obliquely). When using the film lens as a back-light source of a display unit, such as LCD, it is advisable to arrange the line groups or meshes in random cycles or to adjust the angle θ between the respective axes of arrangement of the line groups or mesh patterns and pixels to $15° \leq \theta \leq 75°$.

The antistatic agent may be a surface active agent (anionic or nonionic), metal powder or foil pieces (silver, copper, aluminum, nickel, etc.), metal oxide (tin oxide, indium oxide, etc.), or graphite powder or foil pieces, and its loading ranges from 1 to 50% by weight.

The binder of the coating material is a resin, such as vinyl chloride-vinyl acetate, acrylic resin, polyurethane, polyester, or epoxy resin. Alternatively, the binder may be an electron-radiation- or ultraviolet-curing resin formed of a prepolymer and/or monomer having one or more ethylene-based unsaturated groups among its molecules. For example, the prepolymer may be urethane acrylate, urethane methacrylate, polyester acrylate, or polyester methacrylate. The monomer may be trimethylolpropane triacrylate or dipentaerythritol hexacrylate.

The minute projections may be formed by the gravure, offset, or silk-screen printing method. The conventional multicolor printing method is applicable to the case where the projections loaded and not loaded with the antistatic agent are mixed. In this case, for example, the projections without the antistatic agent are printed in a first print cycle, and the ones loaded with the antistatic agent are printed in a second cycle.

[Advantage of the Third Embodiment]

Since the film itself is not loaded with the antistatic agent, the antistatic agent effect can be secured by means of the antistatic agent in the projections without lowering the optical properties, such as the optical transmission, uniformity, etc.

What is claimed is:

1. A film lens adapted for use with a source light, comprising:

a light transmitting base having first and second opposite sides, said first side having a plurality of concave or convex unit lenses, said second side having plurality of projections, said projections having a profile height not smaller than a wavelength of the source light and not greater than 100 μm, wherein the height $\Delta h$ of each said projection is given by $$\Delta h \geq \lambda_{max}/2\Delta\theta^2,$$

where $\lambda_{max}$ is the maximum wavelength of the visible spectrum of the light source, and $\Delta\theta$ is the angular radius of the light source as viewed through a reflective surface of the film lens, said projections are arranged noncylically in one- and two- dimensional modes, and the width $\Delta x$ of each said projection is given by $$\Delta x \leq 100 \ \mu m, \text{ and}$$

the average distance d between each two adjacent projections is given by $$d < 2P,$$

where P is the arrangement cycle of the unit lenses.

2. A surface light source comprising:

a light guide member comprised of a light transmitting flat plate having first and second opposite sides;

a light source unit located adjacent to at least one of opposite side end faces of the light guide member;

a film lens according to claim 3 located on the first side of the light guide member so that the projections face the light guide member; and a light reflecting layer located on the second side of the light guide member.

3. A surface light source comprising:

a light guide member comprised of a light transmitting flat plate having first and second opposite sides;

a light source unit located adjacent to at least one of opposite side end faces of the light guide member;

a first film lens located on the first side of the light guide member and having a lens array composed of unit lenses arranged one- or two- dimensionally;

a second film lens according to claim 3 stacked on the lens array of the first film lens so that the projections of the second film lens face the first film lens; and a light reflecting layer located on the second side of the light guide member.

4. A film lens adapted for use with a source light, comprising:

a light transmitting base having first and second opposite sides, said first side having a plurality of concave or convex unit lenses, said second side having a plurality of projections, said projections having a profile height not smaller than a wavelength of the source light and not greater than 100 μm, wherein at least some of said projections on the second side of the film lens are comprised of a coating material loaded with an antistatic agent.

5. A surface light source comprising:

a light guide member comprised of a light transmitting flat plate having first and second opposite sides;

a light source unit located adjacent to at least one of opposite side end faces of the light guide member;

a film lens according to claim 4 located on the first side of the light guide member so that the projections face the light guide member; and a light reflecting layer located on the second side of the light guide member.

6. A film lens adapted for use with a source light, comprising:

a light guide plate;

a light transmitting base having first and second opposite sides, said first side having a plurality of concave or convex unit lenses, said second side having a plurality of projections, said projections having a profile height not smaller than a wavelength of the source light and not greater than 100 μm, said light transmitting base being provided on said light guide plate such that said second surface of the light transmitting base faces said light guide plate through gap $\Delta x$, wherein $\Delta x$ is greater than the wavelength of the source light over not less than 80% of a surface area of the light guide plate.

* * * * *

UNITED STATES PATENT AND TRADEMARK OFFICE
CERTIFICATE OF CORRECTION

PATENT NO. : 5,598,280
DATED : January 28, 1997
INVENTOR(S) : Toshikazu NISHIO, Michiko TAKEUCHI, Nobu MASUBUCHI It is certified that error appears in the above-indentified patent and that said Letters Patent is hereby corrected as shown below:

In column 20, lines 3 and 16, change "claim 3" to --claim 1--

Signed and Sealed this

Twelfth Day of August, 1997

Attest:

BRUCE LEHMAN

Attesting Officer

Commissioner of Patents and Trademarks